United States Patent
Denger et al.

(10) Patent No.: US 6,615,771 B2
(45) Date of Patent: Sep. 9, 2003

(54) METHOD FOR OPERATING A DIRECT INJECTION INTERNAL COMBUSTION ENGINE

(75) Inventors: Dirk Denger, Graz (AT); Alois Fürhapter, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/015,789

(22) Filed: Dec. 17, 2001

(65) Prior Publication Data

US 2002/0073939 A1 Jun. 20, 2002

(30) Foreign Application Priority Data

Dec. 18, 2000 (AT) .......................... 924/2000 U

(51) Int. Cl.$^7$ ................................. F02B 69/06
(52) U.S. Cl. ................. 123/21; 123/27 R; 123/316
(58) Field of Search ................................. 123/21, 27 R, 123/316

(56) References Cited

U.S. PATENT DOCUMENTS

| | | | |
|---|---|---|---|
| 3,125,079 A | | 3/1964 | Hoffmann |
| 4,126,106 A | | 11/1978 | Witzky |
| 4,453,513 A | * | 6/1984 | Perrin et al. ................. 123/279 |
| 4,676,215 A | * | 6/1987 | Blocher et al. ......... 123/339.19 |
| 4,765,293 A | | 8/1988 | Gonzalez |
| 4,907,544 A | | 3/1990 | Burrahm |
| 5,322,043 A | | 6/1994 | Shriner |
| 5,979,396 A | | 11/1999 | Yasuoka |
| 6,295,973 B1 | * | 10/2001 | Yang ........................... 123/543 |

FOREIGN PATENT DOCUMENTS

| | | |
|---|---|---|
| AT | 003135 | 10/1999 |
| DE | 2851504 | 6/1980 |
| DE | 3632579 | 7/1990 |

OTHER PUBLICATIONS

Gray et al., "Homogeneous Charge ... Diesel Fuel" in SAE Paper No. 971676, Dearborn, Michigan, May–8, 1997.
Aoyama et al., "An Experimental Study ... Gasoline Engine" in SAE Paper No. 960081, Detroit, Michigan, Feb. 26–29, 1996.

* cited by examiner

Primary Examiner—Willis R. Wolfe
Assistant Examiner—Douglas A. Salser
(74) Attorney, Agent, or Firm—Dykema Gossett PLLC

(57) ABSTRACT

The invention relates to a method of operating a direct injection internal combustion engine operated on both spark-ignitable and autoignitable fuel, more specifically on gasoline, wherein the operational range of the engine is allocated autoignition ranges and spark-ignition ranges, an at least nearly homogeneous fuel-air mixture being produced in the combustion chamber in autoignition ranges, a high compression ratio suitable for spontaneous ignition of the fuel being provided and the combustion in the autoignition range being mostly initiated by spontaneous ignition, and wherein, in the ranges of spark ignition, combustion is initiated by spark ignition of said air-fuel mixture and a spark ignition range is assigned to the full load range and an autoignition range assigned to at least part of the part load range and wherein the effective compression ratio is lowered in spark ignition ranges and combustion controlled by regulating the residual gas content in the ranges of spontaneous ignition. In order to improve the exhaust emission quality while keeping efficiency high, the operational range of the engine is allocated two-stroke and four-stroke operational ranges and the internal combustion engine is operated on a two-stroke cycle in the ranges operating in the two-stroke mode and on a four-stroke cycle in the ranges operating in the four-stroke mode.

10 Claims, 1 Drawing Sheet

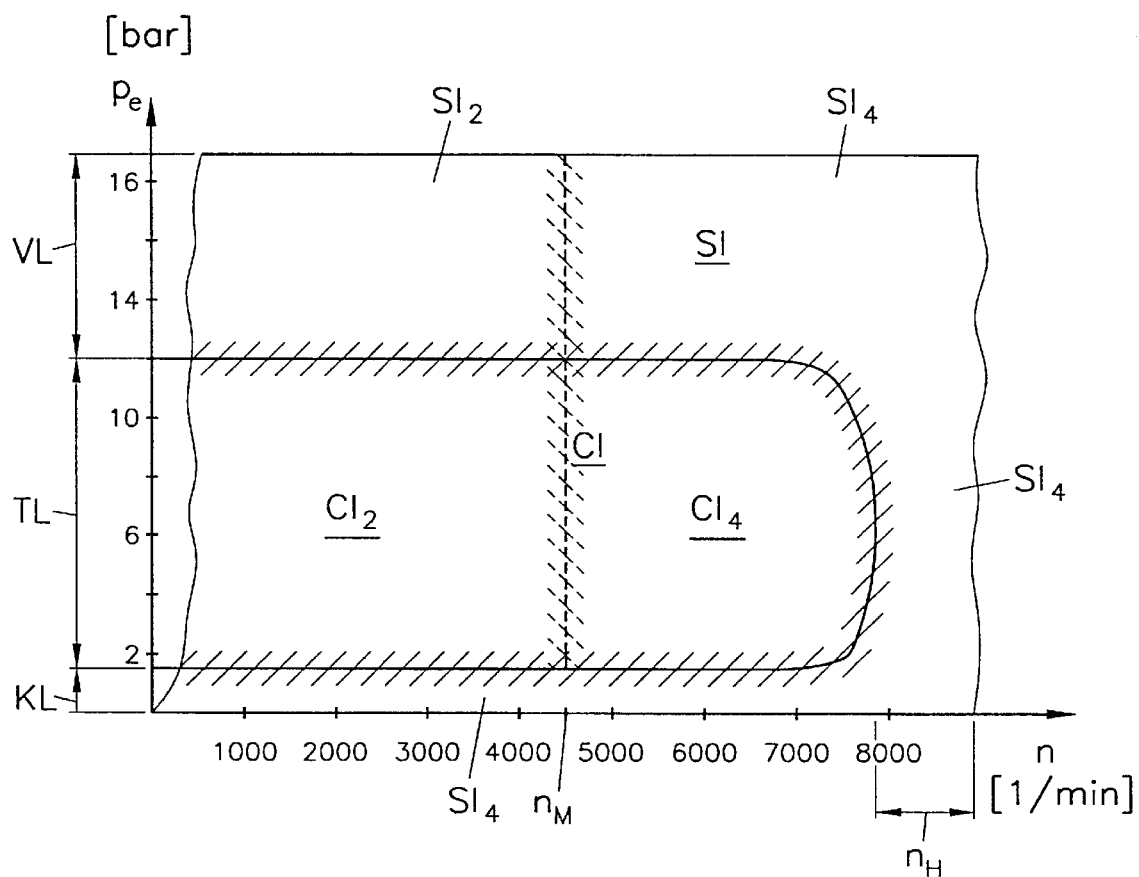

METHOD FOR OPERATING A DIRECT INJECTION INTERNAL COMBUSTION ENGINE

BACKGROUND OF THE INVENTION

The invention relates to a method of operating a direct injection internal combustion engine operated on both spark-ignitable and autoignitable fuel, more specifically on gasoline, wherein the operational range of the engine is allocated autoignition ranges and spark-ignition ranges, an at least nearly homogeneous fuel-air mixture being produced in the combustion chamber in autoignition ranges, a high compression ratio suitable for spontaneous ignition of the fuel being provided, the combustion in the autoignition range being mostly initiated by spontaneous ignition, and wherein in the ranges of spark ignition, combustion is initiated by spark ignition of said air-fuel mixture and a spark ignition range is assigned to the full load range and wherein an autoignition range is assigned to at least part of the part load range and the effective compression ratio is lowered in spark ignition ranges and combustion controlled by regulating the residual gas content in the ranges of spontaneous ignition.

DESCRIPTION OF PRIOR ART

The publication entitled "Homogeneous Charge Compression Ignition (HCCI) of Diesel Fuel", Allen W. Gray et al., SAE Paper No. 971676 discloses that extremely low $NO_x$ and soot emission values are obtained during combustion of an auto-ignited lean fuel-air mixture on account of the homogeneous distribution of concentration and temperature. This process is known as HCCI combustion (Homogeneous Charge Compression Ignition). It is also known that, on account of its high ignition property, diesel fuel is compounding the difficulty of carrying out this combustion process because the time of ignition can be fixated as desired just before top dead center only when the compression ratio and the effective medium pressure are low. As compared to conventional diesel processes, the low compression ratio required, which is of about 10, results in considerable disadvantages regarding the specific fuel consumption and the achievable power consumption, said disadvantages having heretofore prevented this combustion process from being more widely used although it yields favorable emission ratings. Another difficulty that is specific to diesel fuel is the position of the boiling range between approximately 170° C. and 360° C. that hinders evaporation and accordingly homogenization of the cylinder charge and that may yield high $NO_x$, soot and unburned hydrocarbon emissions and involves the risk of diesel fuel mixing with the lubricant.

For HCCI combustion, gasoline presents great advantages on account of its low autoignition quality and the lower gasoline boiling range of between approximately 30° C. and 190° C. Analogous to the diesel engine, the compression ratio may here be raised to values of about 15 to 17. However, and as indicated in the publication entitled "An Experimental Study on Premixed-Charge Compression Ignition Gasoline Engine", Taro Aoyama et al., SAE Paper No. 960081, the achievable effective medium pressure is again limited to the part load range, which represents a drawback.

Furthermore, German Pat. No. DE 36 32 579 C2 discloses an internal combustion engine operating on spark ignition and air compression at a compression ratio similar to that of a diesel engine in which the charge is stratified to ensure ignition of the air-fuel mixture. This stratified charge combustion may also be termed SCSI process (Stratified Charge Spark Ignition). By applying the principle of charge stratification, the composition of the mixture in the range of the ignition source is made to lie within the limits of inflammability during spark discharge for a period that is long enough to allow a large enough flame to be produced to allow the cylinder charge to continue to burn. In the part load range however, such a stratified charge combustion, which relies on spark ignition, does not yield emission ratings that are as favorable as those of HCCI combustion, but it can be operated at much higher medium pressures and yields better soot emission ratings than the diesel engine.

The German Patent No. 28 51 504 A1 discloses a method of operating an internal combustion engine at a variable compression ratio, said internal combustion engine being operated on one kind of fuel for both spark ignition and spontaneous ignition. In this internal combustion engine, the compression ratio is increased in the part load range to carry out autoignition and is reduced in the full load range for spark ignition. For diesel operation, fuel is supplied through an injection nozzle discharging into the main combustion chamber or into a precombustion chamber, a non-homogeneous fuel-air mixture being produced in the combustion chamber as a result thereof. Accordingly, it does not operate on HCCI combustion principles. In one embodiment, the fuel for spark ignition operation is delivered by a carburetor and in another embodiment, it is supplied through an additional injection nozzle discharging into a secondary combustion chamber. In the spark ignition range, combustion is initiated by way of a spark plug ending in the secondary combustion chamber. In the spark ignition mode with fuel injection and air aspiration at full load, there is a charge concentration in the secondary combustion chamber relative to the main combustion chamber. Thanks to this known method, stable operational behavior and good efficiency may be achieved. Nevertheless, the ultra-low emission values known from the HCCI combustion cannot be achieved.

U.S. Pat. No. 4,126,106 A also describes an internal combustion engine which operates both under Otto cycle and on a diesel cycle. During starting and part load operation, a stratified charge is produced by injecting the fuel directly into the combustion chamber and combustion is initiated by spark ignition of this stratified charge. At full load, by contrast, the fuel is directly impinged into the combustion chamber on the hot walls thereof, the fuel evaporating and being ignited by compression according to the diesel combustion process as a result thereof. The engine thereby operates at a compression ratio of less than 16:1. During higher load of the motor however, the time between the start of the injection and the moment of spontaneous ignition is no longer sufficient to form a good mixture, which leads to a degradation of the combustion process and of emissions.

Furthermore, U.S. Pat. No. 3,125,079 A discloses a multi-purpose internal combustion engine that operates both by spontaneous ignition and by spark ignition at a fixed compression ratio of 15:1. The fuel is directly radially injected into the combustion chamber by way of a multi-apertured injection nozzle. This is not suited to produce a high degree of stratification of the charge.

In order to improve exhaust emission quality while keeping a high degree of efficiency on an internal combustion engine operating on spark ignited and on auto-ignited fuel, AT 003135 U suggests to produce, in the autoignition range, an at least nearly homogeneous fuel-air mixture in the combustion chamber. During high load of the engine, this method presents the advantages of HCCI combustion and avoids its drawbacks by shifting to spark ignition. The method thus combines the advantages of the HCCI process with those of the SCSI combustion. In order to permit the setting of a compression ratio that is higher in the part load range than in the full load range, a variable valve control system is provided by means of which the time for opening of at least one intake valve may be modified. The variable valve control system also causes the time for closing of at least one exhaust valve to be modified in function of the operational parameters of the motor so that the quantity of residual gas can be controlled to the effect of an internal exhaust recycling for the purpose of raising the temperature of the charge in the part load range.

An HCCI internal combustion engine must adjust its conditions of ignition to differential fuel properties, surrounding conditions and boundary conditions of the engine while respecting the cycle. Moreover, an HCCI internal combustion engine that operates in a four-stroke mode presents the disadvantage that a high compression ratio is needed to achieve the conditions required for spontaneous ignition, which leads to disadvantages in the full load range. On the other side, an internal combustion engine operating on a two-stroke cycle has smaller volumetric efficiency than a four-stroke internal combustion engine.

Although internal combustion engines that operate both in a two-stroke mode and in a four-stroke mode are well known, they are not known to operate in combination with HCCI combustion. The U.S. Pat. No. 4,907,544 A for example describes a two-stroke internal combustion engine that operates in the four-stroke mode at idle speed.

SUMMARY OF THE INVENTION

It is the object of the present invention to avoid the drawbacks mentioned and to achieve a high quality of exhaust and at the same time high efficiency in direct injection internal combustion engines operated on spark-ignitable and on auto-ignitable fuel.

This is achieved in accordance with the invention in that the operational range of the engine is allocated two-stroke and four-stroke operational ranges and in that the internal combustion engine is operated on a two-stroke cycle in the ranges operating in the two-stroke mode and on a four-stroke cycle in the ranges operating in the four-stroke mode. There is preferably provided that, between low and medium speed of the engine, an autoignition range be allocated a range operating in the two-stroke mode. There is furthermore provided that at full load a spark ignition range be allocated a two-stroke operational mode between low and medium engine speed.

At full load, the autoignition range and the spark ignition range are allocated the four-stroke operational ranges starting from a medium engine speed. To achieve a good starting behavior, it is furthermore advantageous when the cold start and warm up range is allocated a four-stroke operational range. As a result thereof, consumption is even more reduced and emission minimized during starting and warming up.

For the conditions of spontaneous ignition, reduction of the effective compression ratio and control of residual gas respecting the cycles are made possible by combining the internal combustion engine operating according to the HCCI process with a fully variable valve gear. Thereby, the effective compression ratio may preferably be adjusted by mechanically adjusting the geometric compression ratio and/or by means of a variable valve control system. The low compression ratio concurrently increases the full load potential, thus creating design possibilities in engine development. Outside of the autoignition range, in which HCCI combustion is not possible or does not make sense, the internal combustion engine is operated as a direct injection Otto engine with fully variable valve gear and pressure charging at an air-fuel ratio of $\lambda \leq 1$. The control of the autoignition conditions, which respects the cycle, is performed by means of the fully variable valve gear and permits the motor to be optimally tuned in synchronism with the cycle with regard to the fuel properties, the surrounding conditions and the boundary conditions of the engine. At full load and as compared to conventionally charged motors, the full load potential may also be increased by the fully variable valve gear of the charged motor thanks to the control of the valve timing, which has been optimized to full load, and to power losses. Within the scope of the present invention there is more specifically provided that a spark ignition range that operates independent of the medium pressure is allocated a four-stroke operational range at highest engine speed.

The fully variable valve gear more specifically permits to select the valve timing, the valve lifts and a variable edge function of the data curves of the valves according to the cycle. Final throttling and an increase in the efficiency of high pressure are thus made possible in the four-stroke operational range. The valves may be deactivated by means of the fully variable valve gear for the purpose of inducing charge motion. Furthermore the cylinders may be cut off to reduce power loss, to lower the losses of gas exchange and to increase the efficiency of high pressure. With the variable valve control system, it is possible to reduce the effective compression ratio and to thus raise the full load potential. It is also possible to minimize the internal residual gas content, which contributes to raise the full load potential.

BRIEF DESCRIPTION OF THE DRAWING

The invention is explained hereinafter in more detail with reference to the drawing. The FIGURE shows a diagram in which the medium effective pressure $p_e$ is drawn above the engine speed n.

DETAILED DESCRIPTION OF THE PREFERRED EMBODIMENTS

The diagram indicates ranges of spontaneous ignition CI and ranges of spark ignition SI. The autoignition range CI, which, at low, medium and high engine speed, is substantially assigned to the part load range TL, is subdivided into a two-stroke operational range $SI_2$ at low engine speed n and into a four-stroke operational range $SI_4$ at higher speed n of the engine—approximately from a medium engine speed $n_M$. The spark ignition range SI is assigned to the full load range VL and to the range of highest engine speed $n_H$ as well as to the cold start and warm up range KL. The spark ignition range SI is thereby subdivided at high effective medium pressure $p_e$ and low engine speed n into two-stroke operational ranges $SI_2$ and into four-stroke operational ranges $SI_4$ in the rest of the full load range VL, in the range of highest engine speed $n_H$ and in the cold start and warm up range KL. The respective neighbouring ranges may overlap in the characteristic diagram, which is indicated by means of hatched lines.

The method according to the invention combines the advantages of an internal combustion engine operating on HCCI combustion principles with those of an internal combustion engine with fully variable valve gear with charging.

As a result thereof, both the autoignition ranges CI and the spark ignition ranges SI, in which a homogeneous fuel-air mixture is also produced, may operate with minimal exhaust emissions at high excess air. Accordingly, a complicated after-treatment of exhaust gas as it is required with conventional direct injection Otto internal combustion engines is no longer necessary and it is possible to utilize a simple oxidation catalytic converter. By shifting between two-stroke and four-stroke operation, the advantages these methods present for the respective operating conditions are made use of without the need for putting up with the disadvantages they present in other operational ranges.

What is claimed is:

1. A method of operating a direct injection internal combustion engine operated on both spark-ignitable and autoignitable fuel, more specifically on gasoline, the operational range of the engine being allocated autoignition ranges and spark-ignition ranges, an at least nearly homogeneous fuel-air mixture being produced in the combustion chamber in autoignition ranges, a high compression ratio suitable for spontaneous ignition of the fuel being provided and the combustion in the autoignition range being mostly initiated by spontaneous ignition, and, in the ranges of spark ignition, combustion being initiated by spark ignition of said air-fuel mixture and a spark ignition range being assigned to the full load range, an autoignition range being assigned to at least part of the part load range and the effective compression ratio being lowered in spark ignition ranges and combustion controlled by regulating the residual gas content in the ranges of spontaneous ignition wherein the operational range of the engine is allocated two-stroke and four-stroke operational ranges and wherein the internal combustion engine is operated on a two-stroke cycle in the ranges operating in the two-stroke mode and on a four-stroke cycle in the ranges operating in the four-stroke mode.

2. The method according to claim 1, wherein the effective compression ratio may be adjusted by mechanically adjusting the geometric compression ratio.

3. The method according to claim 1, wherein, between low and medium speed of the engine, an autoignition range is allocated a range operating in the two-stroke mode.

4. The method according to claim 1, wherein, at full load, a spark ignition range is allocated a two-stroke operational mode between low and medium engine speed.

5. The method according to claim 1, wherein, at medium speed of the engine and above, an autoignition range is allocated a four-stroke operational range.

6. The method according to claim 1, wherein, at full load, a spark-ignition range is allocated a four-stroke operational range at medium engine speed and above.

7. The method according to claim 1, wherein a spark-ignition range is allocated a cold start and warm up range, wherein a four-stroke operational range is assigned to the cold start and warm up range.

8. The method according to claim 1, wherein, at highest engine speed, a spark ignition range that operates independent of the medium pressure is allocated a four-stroke operational range.

9. The method according to claim 1, wherein the internal combustion engine is supercharged in autoignition ranges.

10. The method according to claim 1, wherein the internal combustion engine is supercharged in spark-ignition ranges.

* * * * *

UNITED STATES PATENT AND TRADEMARK OFFICE
CERTIFICATE OF CORRECTION

PATENT NO.    : 6,615,771 B1
DATED         : September 9, 2003
INVENTOR(S)   : Dirk Denger and Alois Fuerhapter It is certified that error appears in the above-identified patent and that said Letters Patent is hereby corrected as shown below:

Title page,
Item [*] Notice, should read -- Subject to any disclaimer, the term of this patent is extended or adjusted under 35 U.S.C. 154(b) by 78 days. --

Signed and Sealed this

Twenty-seventh Day of April, 2004

JON W. DUDAS
*Acting Director of the United States Patent and Trademark Office*